Oct. 18, 1927.
I. R. SMITH
1,645,666
WHEELBARROW
Filed Nov. 29, 1926
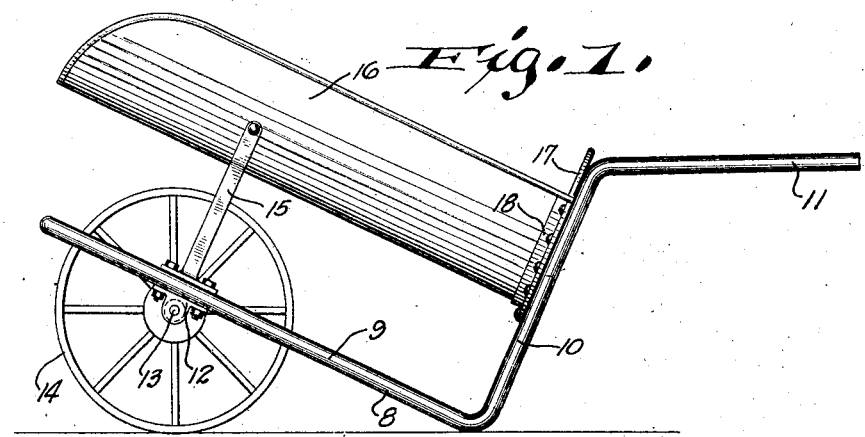
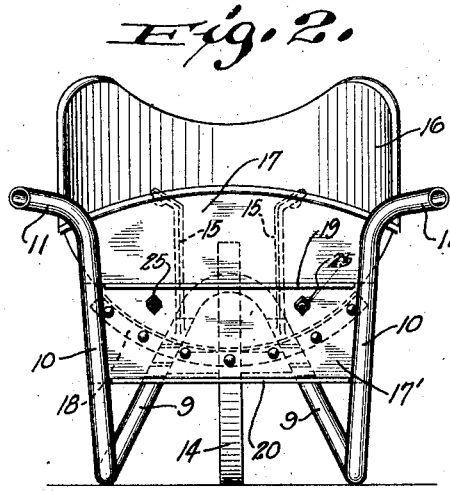
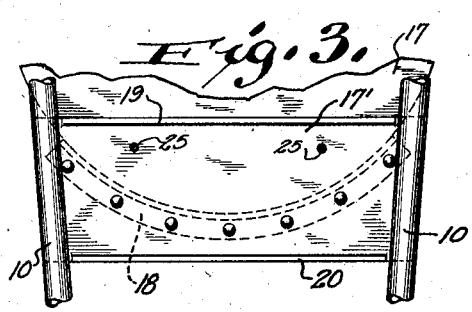
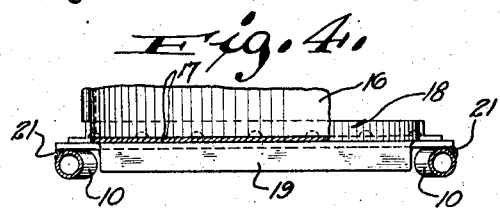
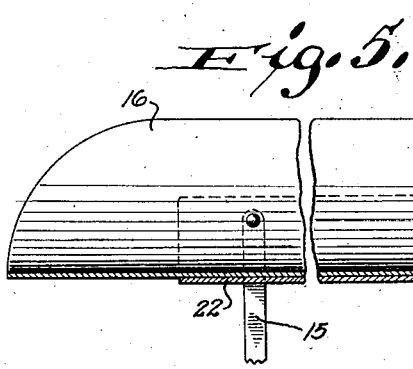
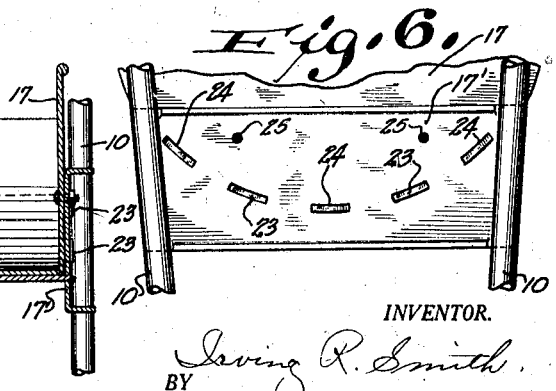
INVENTOR.
Irving R. Smith,
BY Morsell, Keeney & Morsell
ATTORNEYS.

Patented Oct. 18, 1927.

1,645,666

UNITED STATES PATENT OFFICE.

IRVING R. SMITH, OF MILWAUKEE, WISCONSIN, ASSIGNOR TO STERLING WHEELBARROW COMPANY, OF MILWAUKEE, WISCONSIN, A CORPORATION OF WISCONSIN.

WHEELBARROW.

Application filed November 29, 1926. Serial No. 151,409.

This invention relates to improvements in wheelbarrows.

It is one of the objects of the present invention to provide a wheelbarrow of simple and strong construction which is suitable for use in charging into forms, bins or hoppers, and can handle dry or wet materials.

A further object of the invention is to provide a wheelbarrow designed to place the load over the wheel and reduce the efforts of wheeling.

A further object of the invention is to provide a wheelbarrow in which the frame is bent to form legs and handles in one continuous piece.

A further object of the invention is to provide a wheelbarrow in which the hopper is attached at its rear portion to the legs or supporting structure in a very simple and effective manner.

A further object of the invention is to provide a wheelbarrow which is inexpensive to manufacture, is easily handled, and is well adapted for the purposes described.

With the above and other objects in view, the invention consists of the improved wheelbarrow and its parts and combinations as set forth in the claims and all equivalents thereof.

In the accompanying drawing in which the same reference characters indicate the same parts in all of the views:

Fig. 1 is a side view of the improved wheelbarrow;

Fig. 2 is a rear view thereof;

Fig. 3 is a detail view of the rear of the hopper, and on a larger scale;

Fig. 4 is an enlarged fragmentary detail sectional view showing the rear portion of the hopper and the legs;

Fig. 5 is a fragmentary side view partly in section of a modified form of the invention; and Fig. 6 is a rear view thereof.

Referring now more particularly to the drawing, it will appear that the numeral 8 indicates an elongated tubular frame member bent as shown in Figs. 1 and 2, to form a U-shaped frame or supporting portion 9, leg portions 10 extending right angularly upwardly from the rear of the frame portion, and handles 11 extending angularly outwardly from the upper ends of the leg portions.

Depending from the forward part of the frame portion 9 are a pair of bearing members 12 in which is journaled an axle 13 which carries a wheel 14.

A pair of arms 15 extend upwardly from the frame portion 9 and said arms are secured to and support at their upper end portions the medial portion of a metallic hopper 16. The hopper 16 is in substantially the shape of a shovel, open at its forward end, and is formed of a curved sheet of metal. The rear end of the hopper is closed by a plate portion 17.

The rear end portion of the hopper rests on a curved flanged strip 18 which is riveted or welded to the inner face of an outer plate 17', and the rear end portion 17 of the hopper is held against the plate 17' by bolts 25.

The leg portions 10 of the wheelbarrow extend along the sides of the plate 17', adjacent the flanged top and bottom portions 19 and 20 thereof, and are connected to said plate by lines of welding, indicated at 21.

A modified form of the invention is illustrated in Figs. 5 and 6, wherein the hopper 16 is carried by a curved saddle member 22. The saddle is supported from the frame by arms 15. The legs 10 are connected to a rear plate 17' similar to the manner described in the principal form, and the rear end portion 17 of the hopper is secured to said plate 17' by means of bolts 25.

The saddle 22 is formed at its rear end portion with a plurality of tongues 23 adapted to engage slots 24 formed therefor in a curved row in the plate 17'. If desired, the tongues may be slightly bent to insure their retention within the slots.

From the foregoing description, it will be seen that the improved wheelbarrow is designed for strength as well as simplicity and economy in manufacture, and is well adapted for the purpose described.

What I claim as my invention is:

1. A wheelbarrow, comprising a hopper having a closed rear end portion, a supporting member, a plate carried by the supporting member, said plate having openings therein, a curved saddle member engaging and supporting the rear portion of the hopper, tongues formed at the rear portion of the saddle member and entering said plate openings, means for connecting the rear end portion of the hopper to the plate, and a wheel carried by said supporting member.

2. A wheelbarrow, comprising a curved metallic hopper having a closed rear end portion, an elongated tubular member shaped to form integrally a longitudinal supporting portion, legs at right angles thereto, and handles projecting angularly from the legs, a curved saddle member underlying a portion of the hopper, arms supporting the forward portion of the hopper and saddle above said tubular member, a plate connected to the leg portions and having openings therein, the rear end portion of the saddle being formed with tongues entering said plate openings, means for connecting the rear end portion of the hopper to said plate, and a wheel revolubly carried by the forward portion of said tubular member.

In testimony whereof, I affix my signature.

IRVING R. SMITH.